US007720863B2

(12) United States Patent
Fifield et al.

(10) Patent No.: US 7,720,863 B2
(45) Date of Patent: May 18, 2010

(54) SECURITY VIEW-BASED, EXTERNAL ENFORCEMENT OF BUSINESS APPLICATION SECURITY RULES

(75) Inventors: Davin J. Fifield, Hughes (AU); Marcos Calderon Macias, Sammamish, WA (US); Steven D. Brown, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 608 days.

(21) Appl. No.: 11/378,562

(22) Filed: Mar. 17, 2006

(65) Prior Publication Data

US 2007/0220004 A1    Sep. 20, 2007

(51) Int. Cl.
*G06F 17/30* (2006.01)
(52) U.S. Cl. .................... 707/783; 726/2; 726/4
(58) Field of Classification Search .......... 707/1, 707/2, 3, 6, 10, 101, 102, 104.1
See application file for complete search history.

(56) References Cited

U.S. PATENT DOCUMENTS

| 5,765,153 | A | 6/1998 | Benantar et al. | |
|---|---|---|---|---|
| 6,023,765 | A | 2/2000 | Kuhn | |
| 6,161,139 | A | 12/2000 | Win et al. | |
| 6,236,996 | B1 * | 5/2001 | Bapat et al. | 707/9 |
| 6,266,666 | B1 | 7/2001 | Ireland et al. | |
| 6,968,453 | B2 | 11/2005 | Doyle et al. | |
| 7,240,046 | B2 * | 7/2007 | Cotner et al. | 707/3 |
| 2002/0095405 | A1 * | 7/2002 | Fujiwara | 707/3 |
| 2003/0204740 | A1 | 10/2003 | Shapiro et al. | |
| 2004/0059946 | A1 | 3/2004 | Price | |
| 2004/0078569 | A1 * | 4/2004 | Hotti | 713/165 |

(Continued)

FOREIGN PATENT DOCUMENTS

WO    WO 02/067173    8/2002

(Continued)

OTHER PUBLICATIONS

"What's New: BusinessObjects XI—Releases 1 and 2," http://www.businessobjects.com/pdf/products/businessobjects_xi_whats_new.pdf (2005).

(Continued)

*Primary Examiner*—Kavita Padmanabhan
*Assistant Examiner*—Anteneh Girma
(74) *Attorney, Agent, or Firm*—Marshall, Gerstein & Borun LLP (57) ABSTRACT

A method, system and computer program are useful for enforcement of business application security rules in connection with applications external to the business application. To support secured access to data stored in a database system managed by a business application, a rule directed from the business application to a database system specifying security criteria for access to the data is received. A database view to select a subset of the data in accordance with the security criteria is then created, and a representation of the database view is stored in the database system to support the secured access to the subset of the data in connection with a query from the application external to the business application. When the query is then received, the user is identified along with a specification of the database view to return the subset of the data authorized by the security criteria for that user.

15 Claims, 8 Drawing Sheets

U.S. PATENT DOCUMENTS

| | | |
|---|---|---|
| 2004/0117355 A1* | 6/2004 | Lef et al. .................. 707/3 |
| 2004/0186829 A1* | 9/2004 | Suzuki et al. .................. 707/3 |
| 2005/0022029 A1 | 1/2005 | Potter et al. |
| 2005/0102262 A1* | 5/2005 | Nuebling .................. 707/1 |
| 2005/0154699 A1 | 7/2005 | Lipkin et al. |

FOREIGN PATENT DOCUMENTS

| | | |
|---|---|---|
| WO | WO 2004/044751 | 5/2004 |
| WO | WO 2005/052720 | 6/2005 |

OTHER PUBLICATIONS

"Actuate—Leader in Enterprise Reporting Applications," http://www.knowledgestorm.com/ActivityServlet?ksAction=optInReq&SolId=3904&pos=1&spId=ACTUATEBUSINESSINELLIGENC&trkpg=scname&referer=null, pp. 1-3 (Dec. 2005).

"Oracle9i Application Server Release 2," http://www.dba-oracle.com/art_dbazine_garmany_9ias_rel_2.htm, pp. 1-9 (Dec. 2005).

"Oracle Business Intelligence Solutions," http://www.oracle.com/solutions/business_intelligence/Oracle_BI_Solutions_Brochure.pdf (2003).

* cited by examiner

SECURITY VIEW-BASED, EXTERNAL ENFORCEMENT OF BUSINESS APPLICATION SECURITY RULES

BACKGROUND

Enterprise resource planning (ERP) software has generally been directed to supporting a broad set of business functions, including, for instance, product planning, purchasing, inventory maintenance, order tracking, supplier interaction, customer service, accounting, and human resources. Support of such functions has, in turn, been useful in a wide array of business areas, including, for instance, manufacturing, distribution, supply chain management, project management, financial management, personnel management, business analysis, enterprise portals, and commerce gateways. One example of an ERP system capable of such wide-ranging utility is Microsoft® Business Solutions-Axapta®, more recently commercially available as Microsoft Dynamics AX.

ERP software and other business applications have typically included or relied upon a database management system (DBMS) to handle the storage of the often vast amounts of enterprise data involved with each disparate business area supported thereby. The SQL Server® data management and analysis platform commercially available from Microsoft Corp. provides one such DBMS. Due to the wide-ranging nature of the data, the DBMS has often relied upon complicated data schema to store application metadata, which, in turn, described and specified the nature of the enterprise data. In this way, the metadata for a business application could be used to define the relationships underlying, for example, tables and fields that present, in an organized fashion, specific subsets of the enterprise data, such as the data underlying the generation of customized reports detailing customer sales orders or inventory information.

In some business applications, the metadata is additionally arranged in the form of a semantic model. The semantic model describes the data sources and relationships of the enterprise data. More specifically, each semantic model specifies the familiar names for the data fields (e.g., employee name, address, social security number, etc.), as well as mapping information to bind each object in the semantic model (e.g., employee address) to a data source or location. Without the semantic model, the information identifying the data source or location may be too cryptic for a typical user defining new views, reports, etc. of the data. Use of the semantic models also helps support user-friendly APIs that avoid forcing users to write program code, such as SQL or other database queries, to select and retrieve the data from the database.

Semantic models have also been used to specify information regarding relationships between other application metadata, as well as information about how the stored application metadata is analyzed. Other information has also been stored in semantic models, such as navigation information. In these ways, semantic models effectively place a layer on top of business application metadata, so that the business data can be properly understood, navigated, analyzed, etc. The use of semantic models therefore allows end user interfaces to be developed that avoid the potentially complex database query definitions or cryptic data source names that otherwise define the subsets of data to be presented in reports or other views of the database.

Business applications having extensive data handling requirements have relied on an independent DBMS to help manage application data. Using a separate, independent DBMS allows application designers to rely on the DBMS to handle complicated bulk data storage functions, while freeing designers to focus on creating application-specific functions.

But the use of a separate DBMS presents security challenges. First, the security functionality of a typical DBMS is often unsuited to handle application-specific security requirements. For example, the DBMS provided by Microsoft® SQL Server® provides protection of data at the table and column levels. Many business applications require more detailed protection distinguishing business data on, for instance, a row-by-row basis. In such row-level security, business data may be presented with certain rows hidden or withheld based on a user's role or security privileges.

To address this shortcoming of independent DBMS-based solutions, data access and data security have been managed through security rules established via the business application. Specifically, a system administrator or other user is authorized to establish a number of security rules that, in turn, specify the access privileges of each user of the business application. In this way, the business application is then configured as a gateway for granting or denying access to various subsets or other portions of the database. The security of the database is then maintained by permitting database access only through the business application itself. As a result, the security infrastructure established via the configuration of the business application provides a solution localized to the business application.

As long as use of the database is limited to within the business application, the security rules are enforced. Unfortunately, there is often a desire or need for data analysis for which the business application is not suited or designed. In some cases, the business application has been modified to include such data analysis functionality via, for instance, designing a module to extract and process the relevant data. But designing the necessary APIs and other aspects of the module may be unsuitably time consuming and complex, especially for many typical end users of the business application not possessing the requisite programming skills.

More often, such additional data analysis is addressed via an ad-hoc query or OLAP (Online Analytical Processing) module. OLAP generally supports customized views of the business data for a variety of business intelligence purposes, such as the data reporting, modeling, and other processing involved in discovering business trends. But in order to enforce the security rules applied to control access to the data, a system administrator must typically recreate those same rules in the metadata used to support the ad-hoc query or OLAP module. Such replication of the security rules is not only inefficient, but also prone to error. The risk of discrepancies with the security rules of the business application could also increase with the complexity of the security rules, the enterprise, etc.

Complicating matters further, the processing of the data for business intelligence purposes typically involves large-scale data retrieval. Unfortunately, the servers typically used to implement the business application are not designed or configured to support such data retrieval in an efficient manner. For example, business application servers are often not capable of the bulk data retrieval functionality by external servers utilizing the Open Database Connectivity (ODBC) standard API. And in cases where this capability has been available, such data retrieval has not typically enforced the business application security rules. Thus, access to the data through the business application server has been established either without enforcement of the security rules or using an unsuitably slow and inefficient solution having security rule enforcement.

SUMMARY

A technique is disclosed for supporting high-performance, secure access to business application data by a business intelligence or other application. Security rules established via a business application for controlling access to the business application data in its database are automatically enforced and applied to data retrievals by the business intelligence or other applications.

In accordance with one aspect of the disclosed technique, such data retrievals are implemented via an intermediate layer of security views in the business application database generated to avoid direct access to the data tables. The security views are created and modified in accordance with the security rules established via the business application. The security views are then automatically updated and kept synchronized with each change to the security rules.

In accordance with another aspect of the disclosed technique, a business intelligence or other server utilized during the data retrievals includes a semantic model to support the interaction with the business application database. The semantic model and the security views are integrated such that data is provided in accordance with the identity (e.g., privileges) of the user of, for instance, a business intelligence client.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
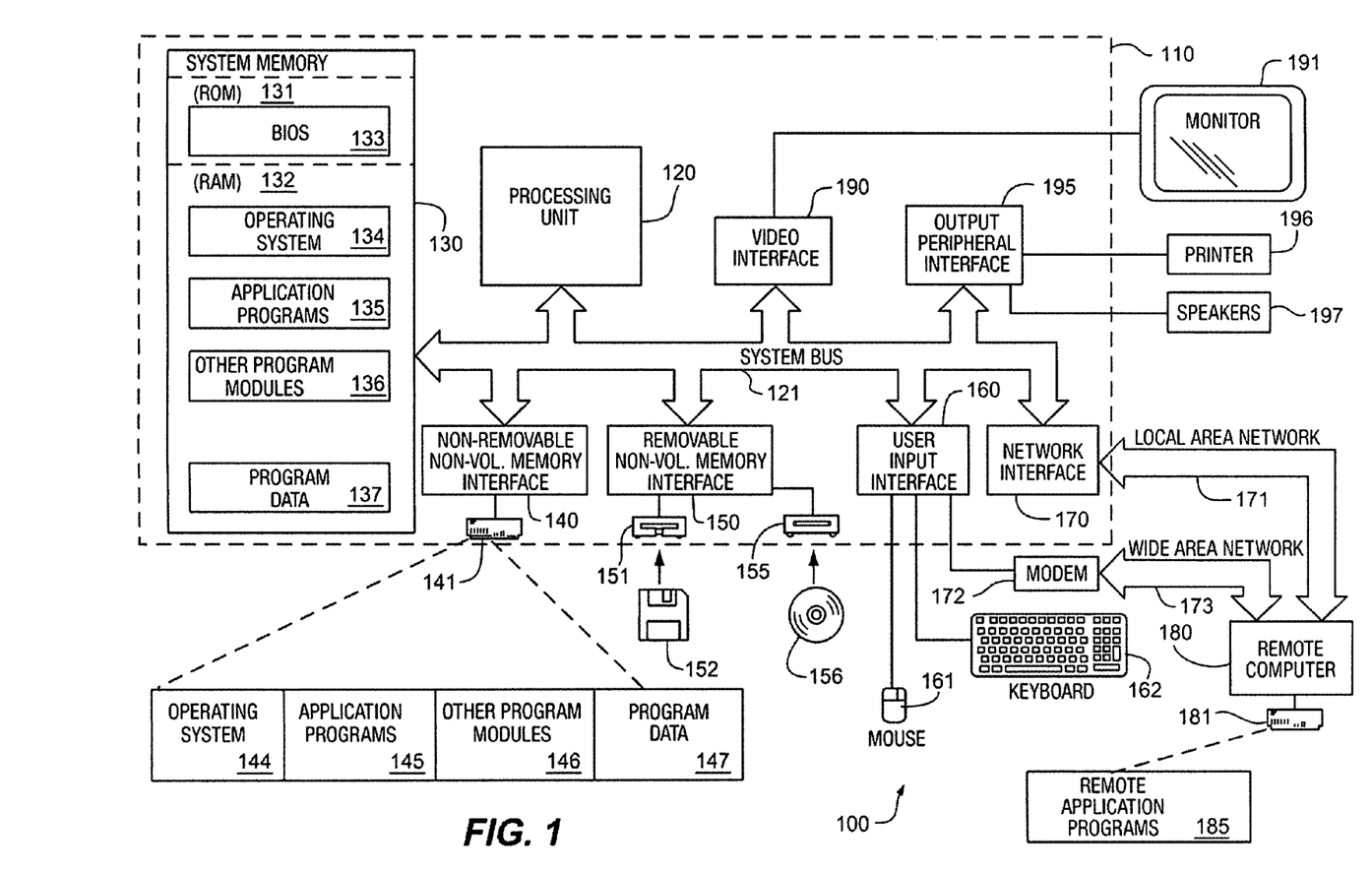
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect-Express (PCI-E).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
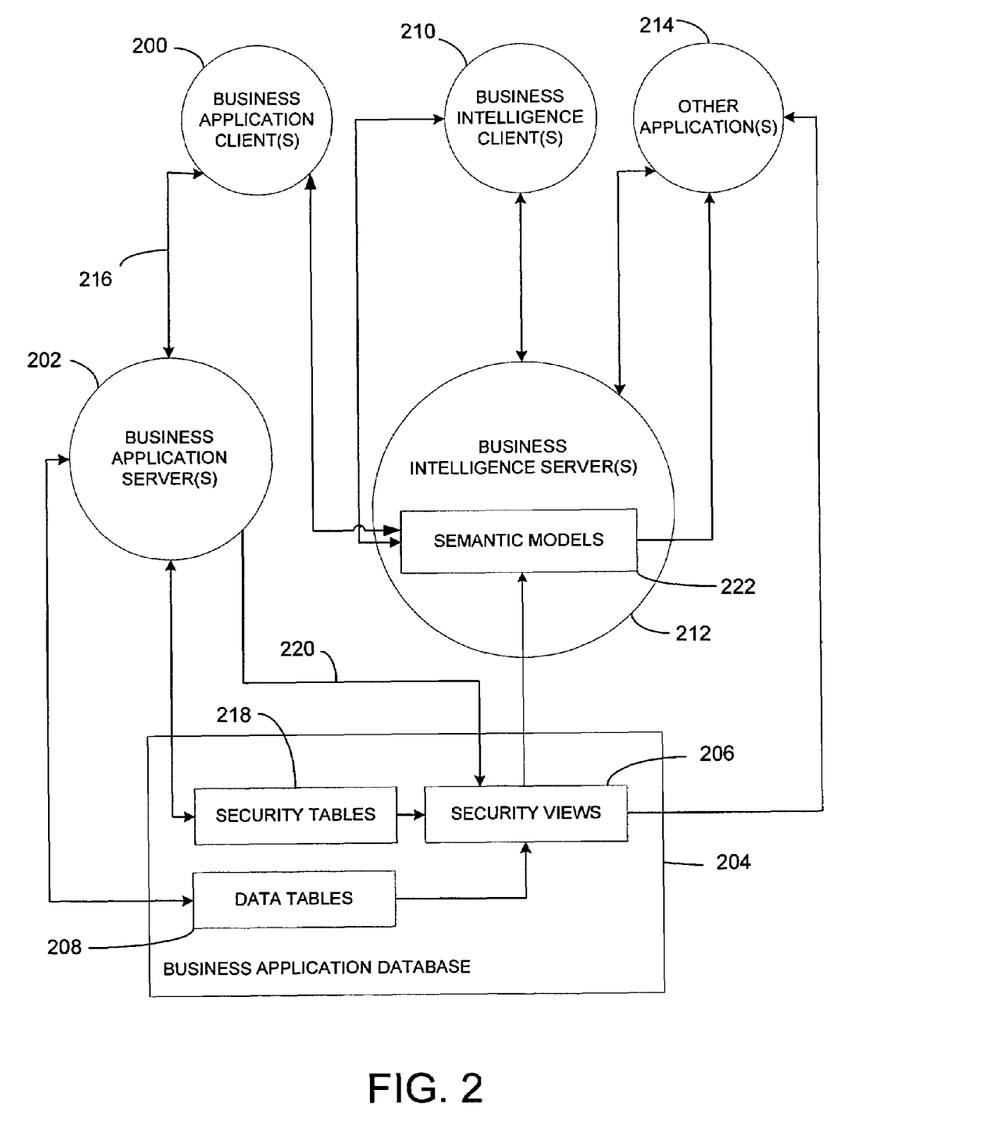
FIG. 2 is a block diagram illustrating a system configured to implement secure business application data retrieval techniques in accordance with one aspect of the disclosure.

With reference now to FIG. 2, a system and method are now described that provide a technique for database security enforcement in an environment external to a business application implemented by, for instance, a system having a business application client 200 and a business application server 202. Together, the client 200 and server 202 establish the security rules governing access to business data stored and managed by a database management system (DBMS) 204. For example, only certain individuals within the enterprise (e.g., company) should have access to employee salary information. The tables of human resource data detailing such information would accordingly be limited to those users of the system having a user identification that falls within a group having access privileges to the information. As long as the users of the system are attempting to access the data via the business application server 202 (i.e., via a client such as the business application client 200), the security rules are enforced.

In accordance with one aspect of the disclosure, the enforcement of the security rules is extended to address requests emanating from an external application by exposing the data stored in the DBMS 204 in a secure fashion. The disclosed technique extends the security rule enforcement while avoiding both (i) the server 202 implementing the business application (and any inefficiencies or bottlenecks presented thereby), and (ii) the risk of discrepancies involved in manually re-creating the security rules in the external environment. To this end, and as described below, security views 206 for the DBMS 204 are automatically created and updated for corresponding data tables 208 stored therein for enforcement of the security rules in connection with data retrieval requests from the external environment. In this way, a high-performance data path is established to support business intelligence and other functions that may involve data queries returning high data volumes for, e.g., trend analysis, etc.

Practice of the disclosed technique is described herein in connection with a business intelligence environment, and a business intelligence application, such as SQL Reporting Services available from Microsoft Corp. While well suited for supporting data retrieval requests from such business intelligence applications, the disclosed technique may be implemented with any application (e.g., Microsoft Excel) suitable for transmitting a request for data from the database.

In the exemplary embodiment shown in FIG. 2, the external environment is represented by a business intelligence application implemented by a business intelligence client 210 and a business intelligence server 212. Alternatively or additionally, the external environment may include any other application 214 configured to request the data from the system. To accommodate the requests from either the business intelligence client 210 or the other application 214, the business intelligence server 212 may act as a middle tier, or intermediary, in communications with the DBMS 204. The middle tier need not take the form of a server associated with a client, but rather may alternatively include an application that has no mechanism to interface with the business intelligence server 212, but can interface directly to the DBMS 204.

In operation, the business application client 200 is generally utilized to read and write data to the data tables 208 of the system. The business application client 200 is also utilized to configure a number of security rules directed to customizing access privileges to the business data handled by the disclosed system. Those security rules, and other communications between the business application client 200 and the business application server 202 may be transmitted via a main communication link 216. In a typical system, the business application server 202 then creates and stores a number of security tables 218 within the DBMS 204 that reflect the security rules. In some embodiments, some security metadata may be stored in a binary file in the business application server 202, where it may be inaccessible to clients who connect directly to the DBMS 204. This situation is remedied via the disclosed technique, as described below, insofar as the security views 206 may additionally reflect such security rules that are not reflected in the security tables 218. In any case, the data stored in the security tables 218 (and/or the business application server 202) may then be utilized during subsequent data retrieval requests from business application client(s) 200 to limit or grant access to the data tables 208, as appropriate. As is often the case, the data stored in the security tables 218 may be encrypted such that unauthorized access thereto would not easily reveal information that could be used to gain access to the data tables 208.

Because some embodiments may have encrypted security information in the DBMS 204, the business application server 202 may also create a database view for each data table that enforces the security rule(s) to be enforced in connection with the business data potentially revealed thereby. The database view may accordingly be referred to as a security view. The data and/or instructions (e.g., SQL code) defining each security view may be pushed down from the business application server 202 via a communication link 220 to the DBMS 204 for storage therein. As shown in the exemplary embodiment of FIG. 2, the security views 206 may be stored separately from other views that may also be created by the business application server 202. Each security view generally establishes a view of a corresponding data table stored in the DBMS 204 in accordance with security criteria.

In accordance with one embodiment of the disclosed technique, one or more routines implemented by the business application server 202 (or some other desired component of the disclosed system) is directed to detecting the arrival, creation, transmission or other characteristic indicative of a security rule. In some cases, the business application server 202 may monitor communications between the business application client 200 and the business application server 202 to this end, while alternatively or additionally communications between the business application server 202 and the DBMS 204 and/or within the business application server 202 itself, may be monitored to capture or intercept the security rule. In any case, the routine(s) may determine that a new or modified security rule has been established in order to capture information indicative of the security rule to support the creation (or modification) of the security view. As a result, the security views 206 are automatically kept synchronized with the changes to the security rules.

In some embodiments, the security views 206 may be generated from data stored in the security tables 218. In fact, in some cases, most of the information may be obtained directly from the security tables 218, such that the security views may not need to be updated when a security rule changes. This scenario may arise when not all of the security tables 218 are encrypted in the DBMS 204. For example, some of the security tables 218 include plain text, in contrast with other security tables 218 that may have, for instance, record-level security stored in a field that is compacted and difficult to translate back into plain text using solely the DBMS 204. In the latter case, the functionality and logic provided by the business application server 202 enables such security tables 218 to be set forth in plain text.

As described below, each security view corresponds with a respective data table (e.g., VendTable, a table listing vendor information for the business). As a result, modifications to a data table may also effect changes to the security view. For instance, if the configuration of the data table is changed to include an additional column of data (e.g., mobile telephone number of the vendor), then the security view is modified to reflect the modification. To this end, information may be provided from the data tables 208 to the security views 206 as shown in FIG. 2. These changes therefore also result in automatic, synchronized updates to the security views 206.

A security view by itself generally returns all records within a table along with a field describing which user account has access to each record. Set forth below is an exemplary instruction or request to show one possible syntax to retrieve data from a security view called for a data table directed to listing data regarding vendors:

select * from VendTableWithUserIDs where the VendTable prefix arises from the name of the original table intended to enforce the security rules through the security view. This query would return all records for each user that has access to the vendors table. So if three users have access to all records, then three sets of the entire table are returned. To retrieve just the records for a single user, the business intelligence server 212 may send the query:

select * from VendTableWithUserIDs where
        WindowsID='domain\alias' where domain\alias is the text representing, for example, the user's domain and user identification.

More generally, the use of database views in accessing data in a secured application database via a DBMS without compromising the security intentions of the secured application is described in co-pending and commonly assigned U.S. patent application Ser. No. 11/020,446, which was filed on Dec. 22, 2004, and entitled "Secured Views for CRM Database," the disclosure of which is hereby incorporated by reference in its entirety and, more specifically, for the disclosure of the manner in which secured views are utilized as an interface to maintain the security intentions.

In addition to the security rules, one or more additional tables may also be created in some embodiments to assist in enforcement of the security rules by, for instance, setting forth data representing the user groups, within specified domains, that have at least view access to a given table, or a field within the given data table, as well as the specific access the group has to the individual fields within the given data table. These tables may be stored in the DBMS 204 in any desired manner, and may be integrated or associated with the security views 206 or the security tables 218.

In some embodiments, the business application supports business intelligence and other external data access by generating a semantic model to act as an interface, or translation tool, between the external environment and the system. As shown in the exemplary embodiment of FIG. 2, the business intelligence server 212 may include a number of semantic models 222 stored therein to support communications with a variety of different external environments. Generally speaking, each semantic model may include a data set or instruction set that effects a translation from one way of referring to the data stored in the system and another way. Often times, for instance, the business intelligence application may refer to the data in a user-friendly manner (e.g., EmployeeSocialSecurityNo), while the DBMS 204 may have a more cryptic reference not as easily decipherable or intelligible to the end user (e.g., SS). The semantic model therefore maps the external environment references to the data to the schema of the DBMS 204. Further information regarding semantic models is provided below in connection with FIG. 5.

To establish and support the data stored in the semantic models, the business application client 200 may push semantic model data to the business intelligence server 212 as shown in FIG. 2. Similarly, the business intelligence client 210 may also modify or otherwise manage the semantic model data. In some embodiments, there may be respective semantic model stored separately for different business intelligence applications, other applications, different versions of such applications (e.g., to support different languages, such as English, French, etc.), and different user perspectives in the same application (e.g., financial vs. human resources).

Generation of the semantic models generally utilizes the knowledge of the business application metadata. Further information regarding the generation of semantic models in this regard may be found in co-pending and commonly assigned U.S. patent application Ser. No. 11/197,141, which was filed on Aug. 4, 2005, and entitled "Semantic model development and deployment," the disclosure of which is hereby incorporated by reference in its entirety.

Generally speaking, the semantic models provide a mechanism for the business intelligence server to pass user identification-based data retrieval requests to the DBMS 204 such that the result set is filtered on that user identification. That is, using the semantic model, the credentials of the user of the business intelligence or other external application are thereby passed to the DBMS 204 via, for instance, an SQL filtering statement, also known as a "where clause". In this way, the semantic models are integrated with the security views 206 such that data from the data tables 208 are read using the security identity of the user accessing the business intelligence client (or other external application).

In other embodiments, the business intelligence or other application may have user-defined or other functions that can express the data retrieval request on a user-identifications specific basis. In such cases, the semantic model data may not be necessary, and no such interface between the external environment and the DBMS 204 is required.

In either case, the secured access to the business data is driven by the credentials of the user attempting to implement a data retrieval from the DBMS 204. Accordingly, the user's identification (or "user ID") may be relied upon to determine the subset of the business data that should be returned in response to the request.

When a user of the business intelligence or other external application initiates and transmits a database query to the business intelligence server 212, the business intelligence server 212 checks the user identification of the user attempting the data retrieval. In semantic model-based embodiments, this check may involve determining whether the user has access to the model. If so, the server 212 takes up the query and incorporates the user identification into the query. An example of this is provided herein above in connection with the description of the security views. In this way, the query is executed against the security view such that only records (or, more generally, the subsets) of the data table that apply to that user identification are returned. The security view would otherwise return all of the data for each user authorized to view the data table. With the query based on the semantic model and the user identification (or, alternatively, a user-defined function specifying both), the security rule is extended and applied on a user-by-user basis in the external environment. In this way, the business intelligence server 212 combines the user identification-based filtering with the filtering of the original query as expressed via the semantic model. Such filtering may be referred to as "user authentication" at the middle tier established by the business intelligence server 212.

Figure 3:
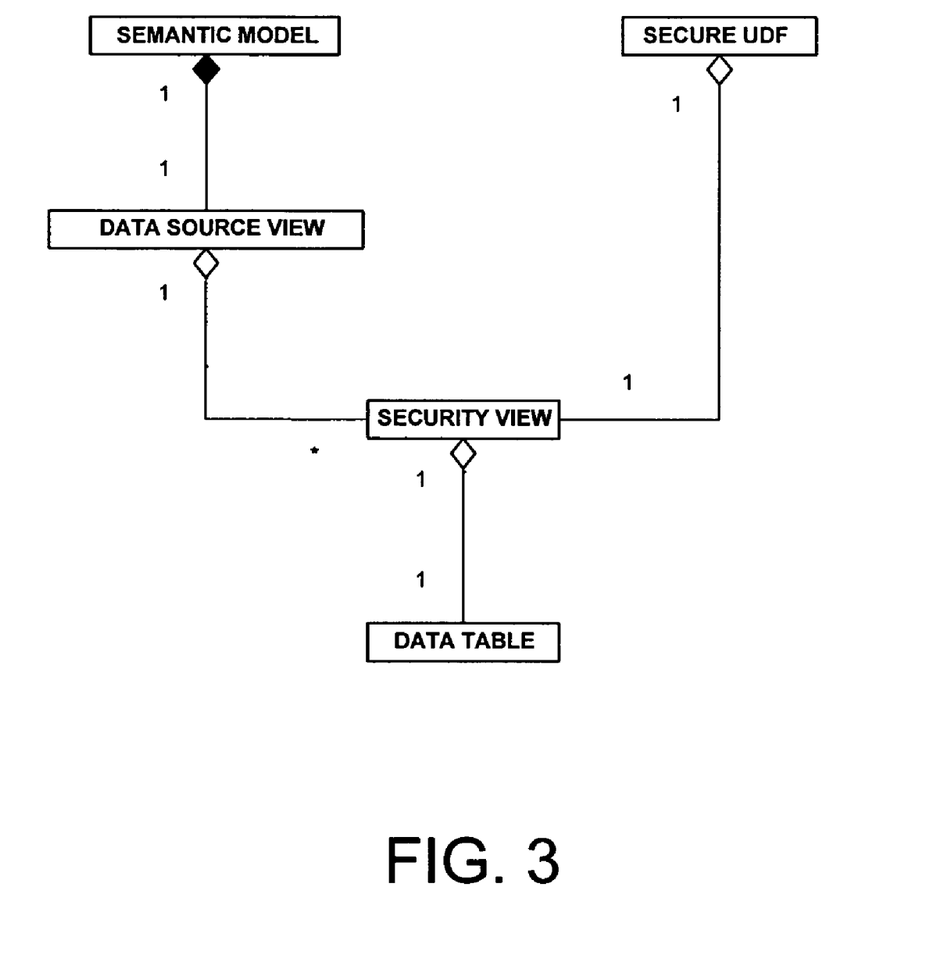
FIG. 3 is a diagrammatic view of the relationships between data and other elements of the system that are utilized to implement the technique depicted via FIG. 2 in accordance with one embodiment.

With reference now to FIG. 3, an exemplary embodiment of the disclosed technique is shown via the relationships between the physical elements that work together to ensure the business application security is honored in the business intelligence environment, such as SQL Reporting Services. Specifically, the semantic model is a metadata format configured in accordance with the SQL Reporting Services to support end user interface with the data tables and, to that end, contains one, and only one data source view (as shown). The data source view effectively corresponds with one-half of the translation or relationship established via the semantic model (see FIG. 5). The data source view references one or more security views to retrieve data. Each security view, in turn, returns data for one and only one data table. Each security view may also have one corresponding secure user-defined function (UDF) used to simplify the filtering of data returned from a security view. UDFs may be used in connection with those contexts (i.e., external applications, business intelligence servers, etc.) that allow another client/server to pass the user credentials into a database function statement, such that the result set can be filtered based on that user identification. In this specific case, the UDF filters records returned from a security view by user identification (i.e., without the use of the semantic model expression).

Figure 4:
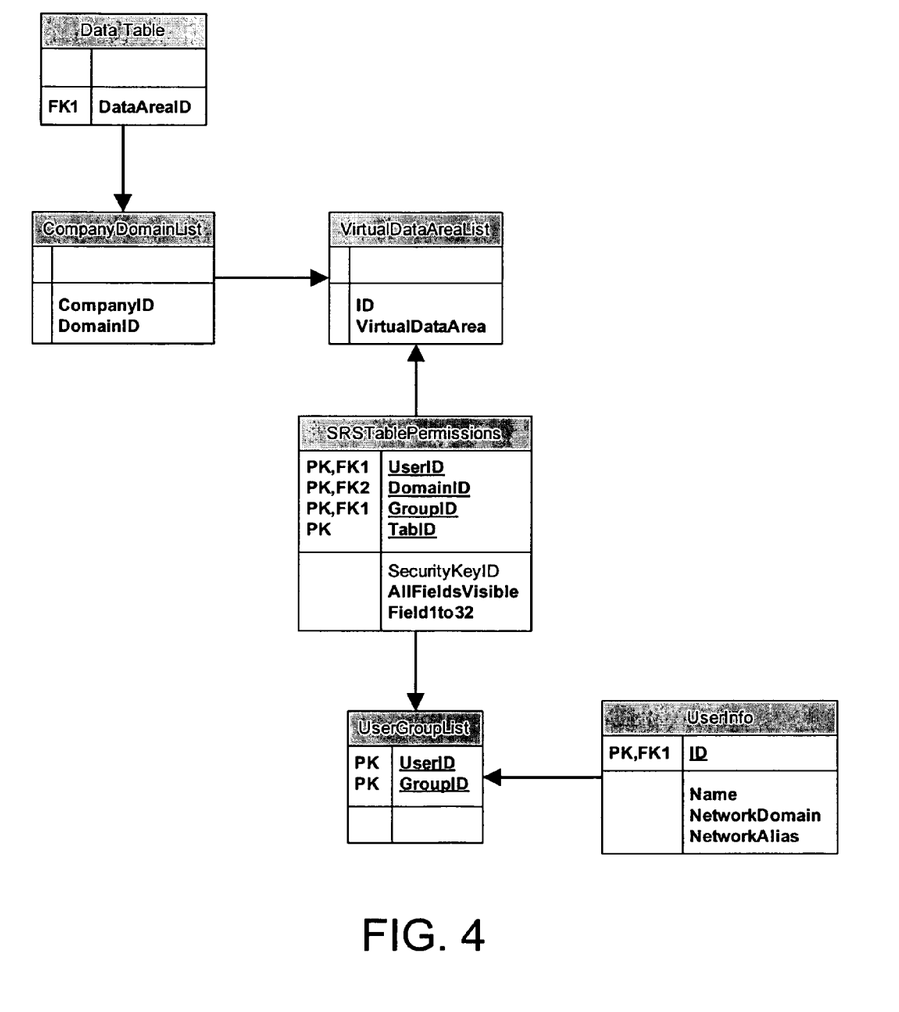
FIG. 4 is a diagrammatic view of a data table and associated security tables that are joined to return a result set in accordance with an exemplary system with which the disclosed technique may be utilized.

FIG. 4 shows a table structure and the relationships between tables in an exemplary database management system suitable for use in connection with the disclosed technique. More specifically, the diagram of FIG. 4 shows the tables that are joined together to return a result set that includes a user account column for a user that has access to a specific record. The accumulation of these records constitutes a result set, and this is what is returned from a Secure View. The fields in the Data Table entity have been intentionally omitted for the sake of clarity in illustration and because they will vary depending on the table that will be accessed from the secure view. The DataAreaID field has been included, however, because it is utilized to join the CompanyDomainList table, one of the security tables joined to the data table. Other security tables are also shown as joined to provide an example where, given for instance a security rule directed to a DataAreaID, one can derive the CompanyID(s), from which one can derive the DomainID(s), from which one can derive the GroupID(s), and from which one can derive the TabID(s), from which one can derive the UserID(s), that are implicated by the security rule. In this respect, each arrow indicates a join to a table. Other security rules may be directed to, for instance, specifying a DomainID or GroupID to which access is restricted. The UserInfo table object has been trimmed to show only the fields that are utilized in a secure view. In this example, the user identification includes an indication of a network domain and a network alias.

Figure 5:
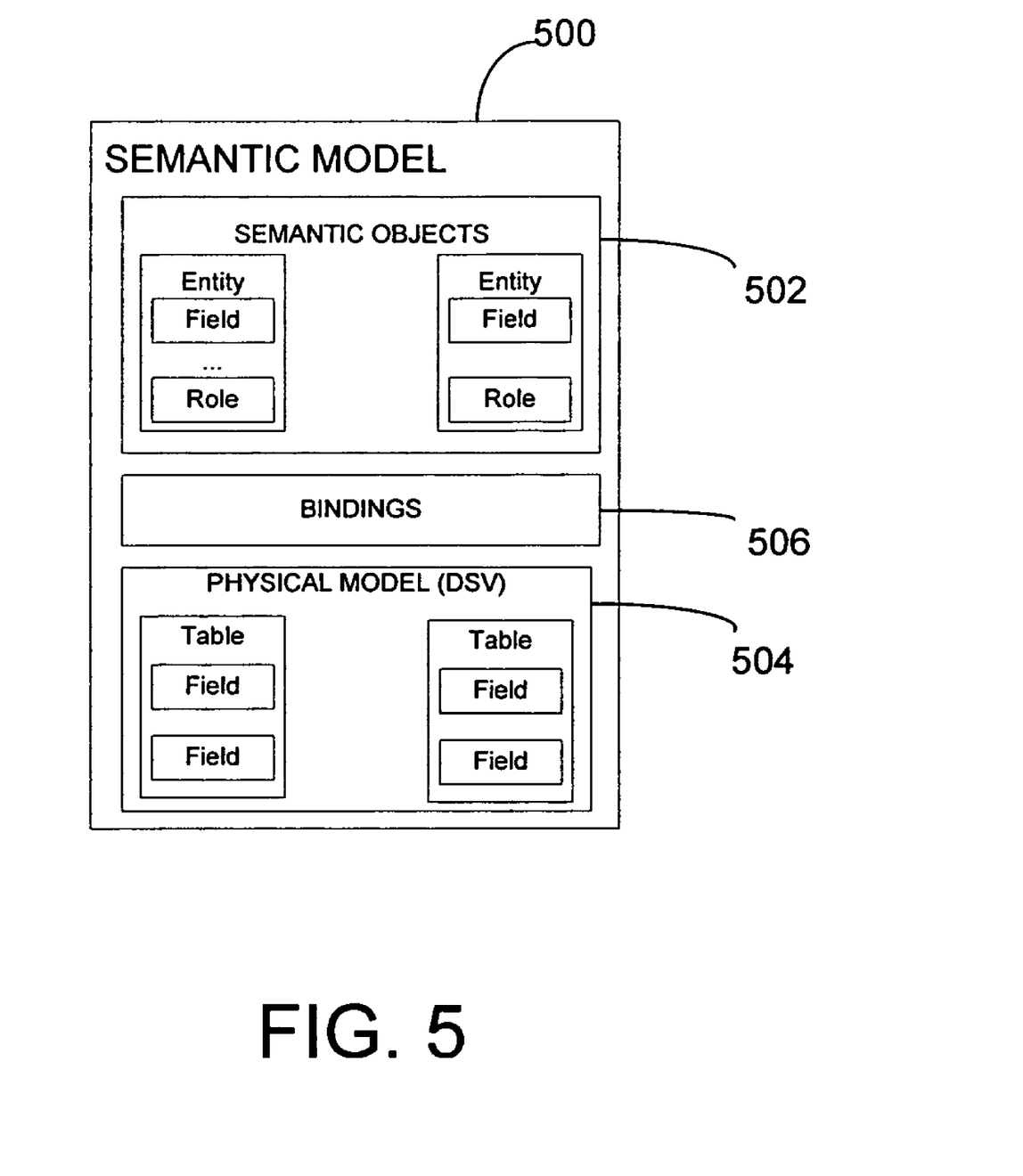
FIG. 5 is a block diagram depicting an exemplary semantic model for use with the disclosed technique in certain embodiments.

With reference now to FIG. 5, an exemplary semantic model definition 500 is set forth in an XML file containing three main elements. First, the definition 500 includes a set 502 of semantic model objects, each of which includes the user's model of the data, described in terms of objects or business oriented concepts easy to understand by the user. Each object may consist of Entities, Fields and Roles. Entities usually are mapped into physical tables, fields into physical table fields, and roles into foreign keys. The definition 500 also includes a set 504 of physical model(s), where the physical models collectively set forth the schema of the physical database, with some optional transformations to achieve some desired result required by the business application, that may avoid direct use of the name of the physical table with a view to secure the table information. Lastly, the definition 500 includes a set 506 of bindings, where each binding describes how the semantic model is represented in a physical model, by binding semantic objects 502 to their corresponding physical objects 504 in the model.

Figure 6:
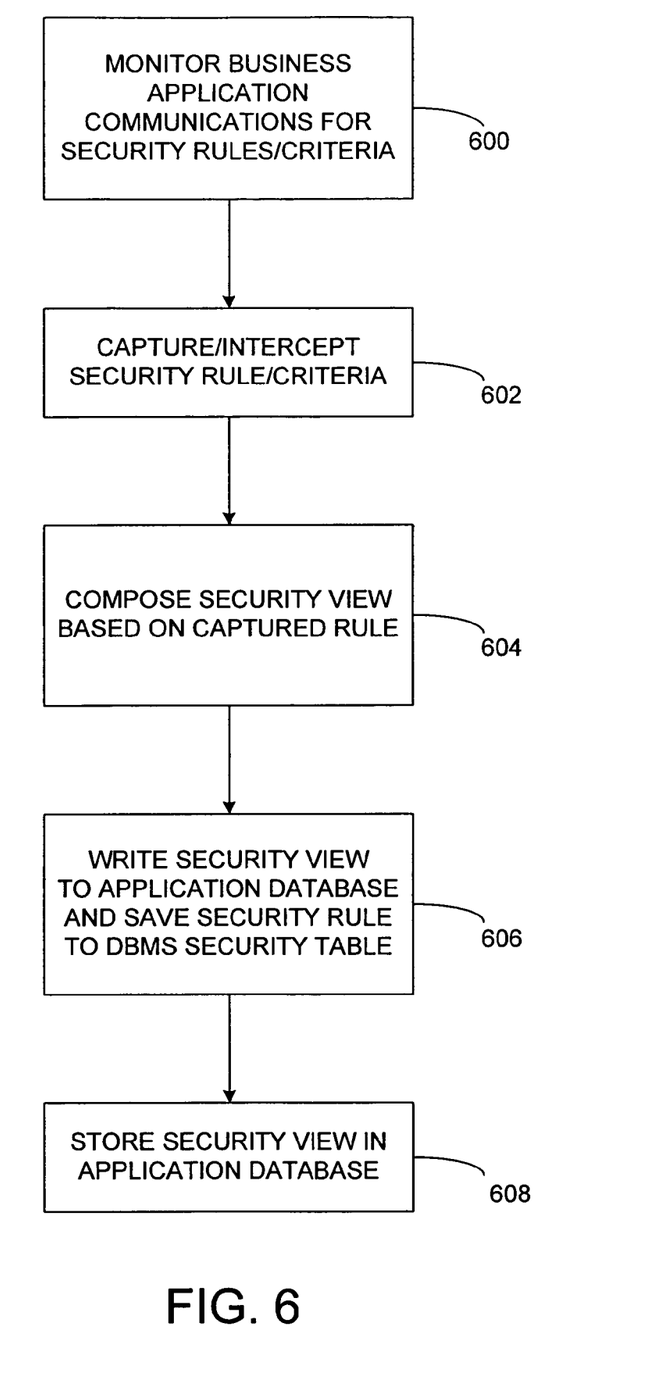
FIG. 6 is a flow diagram depicting a technique and method in accordance with one aspect of the disclosure for configuring the disclosed system to extend security rules to data retrieval requests from environments external to the disclosed system.

FIG. 6 depicts the steps taken during implementation of an exemplary routine or method in accordance with one aspect of the disclosure directed to supporting secured access to data stored in the DBMS 204 (FIG. 2). The exemplary routine or method involves monitoring the business application environment (e.g., either the client 200 or the server 202 or the communications proceeding between the two) in a block 600 for communications specifying, modifying, or otherwise involving security rules or criteria. The monitoring may occur continuously or semi-continuously, as desired, such that for instance the communications (or a buffer or other memory involved in such communications) are periodically monitored or evaluated. Upon detecting a security rule or security criteria, the data indicative of the security rule or criteria is captured, intercepted, gathered or otherwise received in a block 602. The receipt of the security rule/criteria data may, for example, be received by a component of the business application server 202, as shown in FIG. 2. Next, the business application server 202 or other responsible entity (such as a business application client or other entity) composes in a block 604 a security view based on the captured security rule. As described above, the security rule is configured to be a database view that applies the security rule/criteria to a result set. A block 606 then writes the security view to the DBMS 204 and, in some embodiments (e.g., where the business application server 202 is involved in the implementation) also saves the security rule to the security table 218 in the DBMS 204 (e.g., the SRSTable Permissions table shown in FIG. 4). Lastly, the DBMS 204 may implement a routine directed to storing data indicative of the security view in the DBMS 204 as shown at element 206 of FIG. 2.

Figure 7:
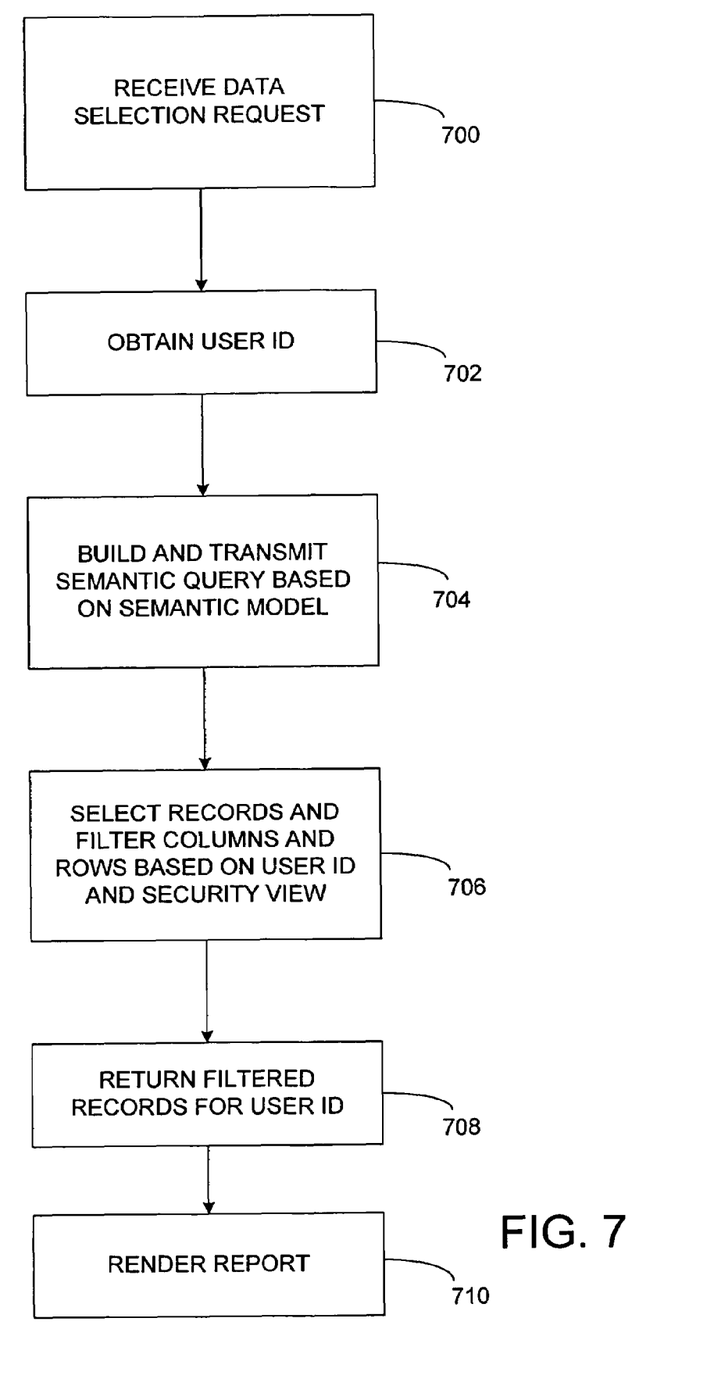
FIG. 7 is a flow diagram depicting a technique and method in accordance with another aspect of the disclosure for secured retrieval of data stored in the disclosed system.

Turning to FIG. 7, another aspect of the disclosure involves the secured retrieval of data from the DBMS 204 after the security rule has been captured and resolved via the aforementioned procedure into a security view for later use. In the embodiment shown, a data selection request is received in a block 700 by, for instance, the business intelligence server 212 or other entity positioned to act as an interface to the DBMS 204. In response, the server 212 or other entity determines or, if necessary, obtains in a block 702 the user identification information of the user initiating the request. In this specific embodiment in which a semantic model is used to support end user interaction, a block 704 then builds and transmits a semantic query based on the semantic model and the selection request.

The following steps in the procedure of FIG. 7 may be implemented by the DBMS 204 in response to the semantic model-based query transmitted from, for instance, the business intelligence server 212. Specifically, the records in the table identified by the query are selected, and the columns and rows filtered, in a block 706 based on the security view and user identification identified via the query. The DBMS 204 (or other interface) may then return the filtered records in a block 708 given the user's access privileges. Lastly, the business intelligence server 212 (or other component of the external application) may render in a block 710 a report, or format or otherwise generate some other desired interface called for by the initial data selection request.

An exemplary security view is now described in accordance with an embodiment in which the view generally includes two select statements. The inner select is responsible for joining to the appropriate security tables so that row-level security is enforced. In addition, the inner select returns a column containing the data to describe which fields the user has at least read access to. The outer select uses the field mask to determine whether or not to display the data within each column. The outer select uses the FIELDVISIBLE function to conditionally show the contents of the field. The exemplary security view is set forth below.

```
CREATE VIEW DBO.VENDTABLEWITHUSERIDS
AS
SELECT
    WINDOWSID,
    CASE WHEN DBO.FIELDVISIBLE(FIELDMASKSTRING, 1) > 0
        THEN ACCOUNTNUM
        ELSE NULL
        END AS ACCOUNTNUM,
    .
    .
    .
FROM
(
    SELECT DISTINCT
        DBO.WINDOWSID(UserInfo.networkDomain,
UserInfo.networkAlias) AS WINDOWSID,
        VENDTABLE.RECID AS ELIGIBLERECID,
        DBO.FIELDMASK(CompanyDomainList.domainId,
UserGroupList.groupId, 505,
DBO.WINDOWSID(UserInfo.networkDomain, UserInfo.networkAlias))
AS FIELDMASKSTRING
    FROM VENDTABLE
        LEFT OUTER JOIN VIRTUALDATAAREALIST ON
            VIRTUALDATAAREALIST.VIRTUALDATAAREA =
VENDTABLE.DATAAREAID
        INNER JOIN CompanyDomainList ON
            CompanyDomainList.companyId = DATAAREAID OR
            CompanyDomainList.companyId =
VIRTUALDATAAREALIST.ID
        LEFT OUTER JOIN SysSRSTablePermissions ON
            SysSRSTablePermissions.DomainId =
CompanyDomainList.domainId AND
            SysSRSTablePermissions.TabId = 505
        INNER JOIN UserGroupList ON
            UserGroupList.groupId = 'ADMIN' OR
            UserGroupList.groupId =
SysSRSTablePermissions.GroupId
        INNER JOIN UserInfo ON
            UserInfo.id = UserGroupList.userId AND
            UserInfo.enable = 1
    WHERE
    (
        (UserGroupList.groupId = 'ADMIN') OR
        (CompanyDomainList.companyId = 'dat' AND
UserGroupList.groupId = 'AP1' AND ((AccountNum>=N'3000' AND
AccountNum<=N'3010')))
    )
) as ELIGIBLERECORDS
INNER JOIN VENDTABLE ON
VENDTABLE.RECID = ELIGIBLERECID
```

Figure 8:
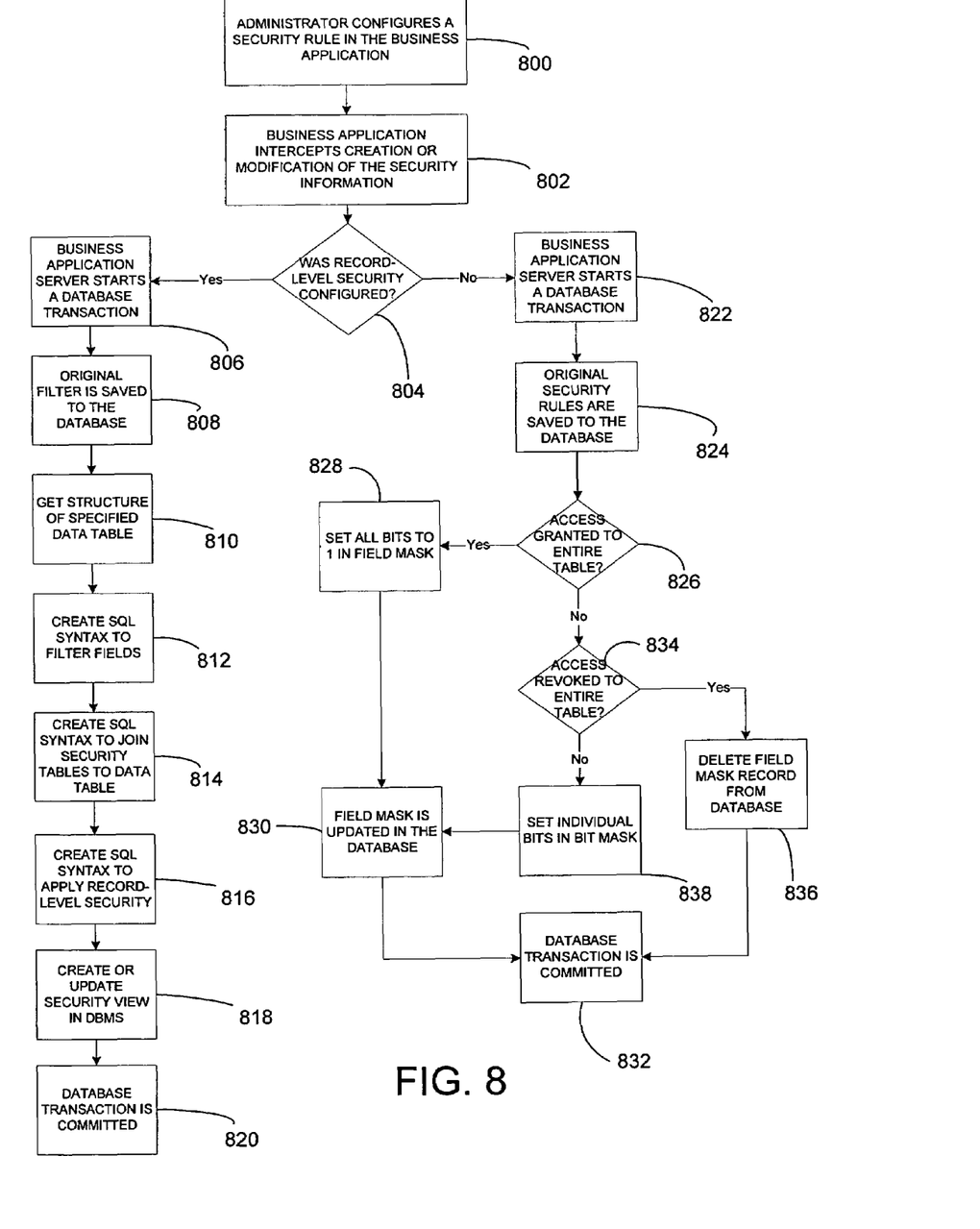
FIG. 8 is a flow diagram depicting a technique and method in accordance with yet further aspects of the disclosure for configuring the disclosed system in accordance with an exemplary embodiment.

The above-described technique is suitable for use with security rules or criteria involving record/row level security, field/attribute security, entity/table security, as well as company level security. FIG. 8 provides a set of exemplary procedures through which these different types of security rules are processed to automatically update or create the corresponding security view in accordance with the disclosed technique.

With reference to FIG. 8, at the outset an administrator configures a security rule in a block 800 in the business application, after which the business application intercepts the creation or modification of the security information in a block 802. As described above, the disclosed technique may be implemented to create or modify a security view when a security rule is configured or, more generally, when a data table is created or modified, a semantic model referencing a table is created, record-level security for a table is created, updated or removed, or when the administrator explicitly instructs the business application to create a security view. In any case, a decision block 804 implemented by the business application next determines whether record-level security was configured via the new or modified rule. If yes, control transfers to a block 806, in which the business application initiates a database transaction. An original filter may then be saved to the database in a block 808, and the structure of the data table specified in the rule is retrieved in a block 810. Next, an SQL statement or syntax is generated to filter the fields as required by the non-security-related filtering in a block 812, and the SQL statement or syntax to join the security tables to the data table is specified in a block 814 for the security-related filtering. A block 816 then creates the SQL statement or syntax to apply the record-level security implicated by the rule, after which the security view in the DBMS 204 may be updated to reflect the new database view in a block 818, thereby completing the database transaction in a block 820.

If record-level security was not configured by the newly created or modified security rule, then control passes to a block 822 in which the business application server 202 starts a database transaction after which the original security rules are saved to the database in a block 824. In this case, only the data table for field-level security was modified, in which case the security view is not modified. Instead, security metadata is persisted in the DBMS 204 (FIG. 2) in a format suitable to be utilized by the security view in accordance with the following procedure. A decision block 826 then determines whether access is to be granted to the entire table and, if yes, all bits in a field mask are set to "1" in a block 828, and the field mask is updated in the DBMS 204 in a block 830 and the database transaction is completed in a block 832. Generally speaking, bit masks may be stored in the DBMS 204 to describe whether data in each individual field within a data table should be displayed to users Patent of a specified group. If data should be displayed for a given field, then the corresponding bit within the bit mask is set to "1". Otherwise, it is set to "0".

If access is not granted to an entire table, a further decision block 834 determines whether access is to be revoked to the entire table. If yes, control transfers to a block 836 in which the field mask record is deleted from the database, thereby ending the transaction. If not, control passes to a block 838 in which the individual bits in the bit mask are set accordingly. The field mask is then updated in the database in the block 830, and the transaction is complete.

In addition to the techniques described above in the exemplary procedure of FIG. 8 for addressing modifications to row/record security, table security and field attribute security, the disclosed technique may also be applied to modifications involving company level security rules. Company level security may be enforced on tables that have a field indicating the company(ies) to which a record is available. In an exemplary business application (see, e.g., FIG. 4), the field is DataArealD. The inner select statement of the security view will then join the data table to a table (e.g., CompanyDomainList), which describes the domains to which the company belongs. Once the domain is determined, one can determine the groups and thus, the users, having access to the record at issue. In some cases, the DataAreaID field in the data table may contain either a specific company identification, or a virtual company identification, but not both. Security rules may therefore be set at the company level involving comparisons with a physical company list as well as a virtual company list.

Practice of the disclosed methods, systems and techniques is not limited to any particular type of data container or database architecture. More specifically, the business application data may be stored in one or more databases having any one of a number of different structures. For instance, the structure(s) may include one or more data containers, with each container having one or more records, the data within each record being organized into one or more fields. Alternatively or additionally, the structures may be arranged in a relational database system(s), where the data containers may be referred to as tables, the records referred to as rows, and the fields referred to as columns. Object oriented databases may also be utilized, in which case the data containers may be referred to as object classes, the records referred to as objects, and the fields referred to as attributes. The foregoing description is provided with the understanding that the use of certain database terminology should not be construed as limiting the practice of the disclosed methods, systems or techniques to a particular database architecture.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer-readable medium adapted to store computer-executable instructions for supporting secured access to data stored in a database system managed by a business application, wherein the computer-executable instructions comprise computer code to:

execute a first business application on a business application client that is external to the database system, wherein
the first business application is configured to read from and write to a database table that is managed by a database system,
the business application client is adapted to configure a rule to customize access to the database table,
the rule including an external environment reference to the database table,
the business application client is communicatively coupled to a first business application server,
the first business application server is adapted to store and implement the configured rule,
the database system is separate and distinct from the first business application, and
the database system provides access to the database table to the first business application;
monitor the first business application execution for communication of the configured rule between the business application client and the first business application server;
intercepting the configured rule directed from the first business application to the first business application server, the configured rule specifying security criteria for access to the data, wherein the security criteria of the rule specifies what data may be accessed for retrieval from the database table;
translating the external environment references to a schema of the database table;
create a database view using the translated external environment references, wherein the view corresponds to a subset of the data of the database table of the first business application in accordance with the security criteria of the security rule intercepted from the first business application;
store a representation of the database view in the database system;
receive a query from a second application for data of the database table, the second application being separate and distinct from the first business application; and
respond to the query by providing data from the database tables of the first business application based on the database view and a user identifier.

2. The computer-readable medium of claim 1, wherein the configured rule directed to the first business application server is captured prior to encryption of the security criteria within the database system.

3. The computer-readable medium of claim 1, wherein the database view is created automatically upon receipt of the configured rule specifying the security criteria.

4. The computer-readable medium of claim 1, wherein the security criteria specify a record-level security rule.

5. The computer-readable medium of claim 1, wherein the security criteria specify a field/attribute security rule, and wherein the computer-executable instructions comprise further computer code to create a table separate from the configured rule to store data representative of user groups having access to the subset of the data.

6. The computer-readable medium of claim 1, wherein the stored representation of the database view comprises metadata specifying a database table to which the security criteria applies.

7. The computer-readable medium of claim 6, wherein the computer-readable instructions comprise further computer code to update the stored representation of the database view when a modification is made to the metadata.

8. The computer-readable medium of claim 1, wherein the stored representation comprises a bit mask for a user group, the bit mask indicating whether data in respective fields within the subset should be displayed to users of a specified group.

9. The computer-readable medium of claim 8, wherein the security criteria pertain to the secured access of the user group to a database table, and wherein the bit mask is universally populated with true values.

10. A method for secured retrieval of data stored in a database system managed by a business application that specifies a plurality of security rules governing access to the data, the method comprising the steps of:

executing a first business application on a business application client that is external to the database system, wherein
the first business application is configured to read from and write to a database table that is managed by a database system,
the business application client is adapted to configure a rule to customize access to the database table,
the rule including an external environment reference to the database table,
the business application client is communicatively coupled to a first business application server,
the first business application server is adapted to store and implement the configured rule,
the database system is separate and distinct from the first business application, and
the database system provides access to the database table to the first business application;

monitoring the first business application execution for communication of the configured rule between the business application client and the first business application server;

intercepting the configured rule directed from the first business application to the first business application server, the configured rule specifying security criteria for access to the data, wherein the security criteria of the rule specifies what data may be accessed for retrieval from the database table;

translating the external environment references to a schema of the database table;

creating a database view using the translated external environment references, wherein the view corresponds to a subset of the data of the database table of the first business application in accordance with the security criteria of the security rule intercepted from the first business application;

storing a representation of the database view in the database system;

receiving a query from a second application for data of the database table, the second application being separate and distinct from the first business application; and responding to the query by providing data from the database tables of the first business application based on the database view and a user identifier.

11. The method of claim 10, a semantic model translates the request, the semantic model derived from the business application.

12. The method of claim 10, wherein the query comprises a SQL filtering statement.

13. The method of claim 10, further comprises the step of generating a database function to specify the query.

14. A computing system including a processor and a memory coupled the processor for processing a data retrieval request from an external application operated by a user, the system comprising:

a database management system having a schema describing a relationship between business data stored in a plurality of data tables; and a business application that is external to the database management system, the business application in communication with the database management system to store a database view for the data tables to enforce a security rule governing access to the business data;

the business application physically configuring the processor for:

executing the business application on a business application client that is external to the database management system, wherein:
the business application is configured to read from and write to a database table that is managed by the database system,
the business application client is adapted to configure a rule to customize access to the database table, the rule including an external environment reference to the database table,
the business application client is communicatively coupled to a first business application server,
the first business application server is adapted to store and implement the configured rule,
the database management system is separate and distinct from the first business application, and
the database management system provides access to the database table to the business application;

monitoring the business application execution for communication of the configured rule between the business application client and the business application server;

intercepting the configured rule directed from the business application to the business application server, the configured rule specifying security criteria for access to the data, wherein the security criteria of the rule specifies what data may be accessed for retrieval from the database table;

translating the external environment references to a schema of the database table;

creating a database view using the translated external environment references, wherein the view corresponds to a subset of the data of the database table of the business application in accordance with the security criteria of the security rule intercepted from the business application;

storing a representation of the database view in the database management system;

receiving a query from a second application for data of the database table, the second application being separate and distinct from the business application; and responding to the query by providing data from the database tables of the business management application based on the database view and a user identifier.

15. The system of claim 14, wherein the second application comprises a semantic model to determine the database view implicated by the data retrieval request.

* * * * *